Sept. 20, 1955  W. S. OLIWA  2,718,601
PULSE GENERATOR
Filed June 2, 1951
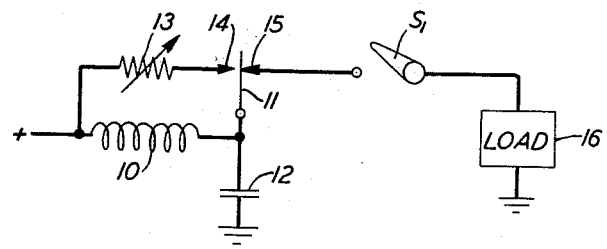
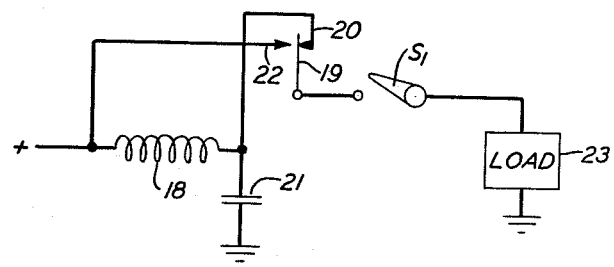
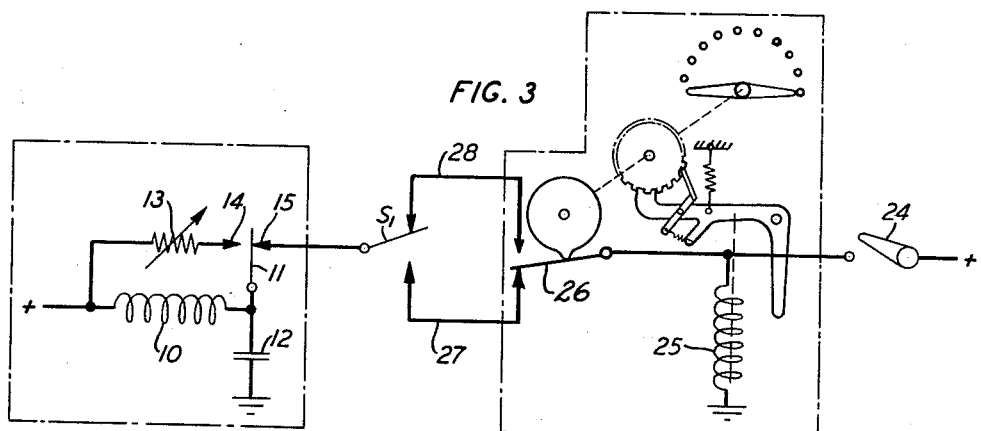
INVENTOR
WALTER S. OLIWA
BY
*William P. Slover*
AGENT

United States Patent Office 2,718,601
Patented Sept. 20, 1955

2,718,601

PULSE GENERATOR

Walter S. Oliwa, Orange, N. J., assignor to Monroe Calculating Machine Company, Orange, N. J., a corporation of Delaware Application June 2, 1951, Serial No. 229,644

9 Claims. (Cl. 307—132)

This invention relates to new and useful improvements in pulse generators, particularly relay pulse generators.

Various types of relay pulse generators are used in a variety of systems requiring electrical pulses of controlled frequency and duration. These known relay pulse generators have a common disadvantage, however, in that they operate to produce pulses whether or not the load to be pulsed is connected thereto. Obviously, this results in a waste of electrical energy.

The principal object of the invention, therefore, is the provision of a relay pulse generator adapted to produce pulses of controlled frequency and duration only when the load to be pulsed is connected thereto.

In one form of the invention a condenser is connected in series with a relay coil between positive supply and ground, the positive supply being applied to one terminal of the coil. A transfer contact of the relay is connected between the coil and the condenser and is adapted when the relay is deenergized to maintain contact with the load circuit, and when the relay is energized to make contact with a variable resistor applied to the positive terminal of the coil. The load circuit is provided with a switch for connecting and disconnecting the load from the generator.

When the load switch is opened, the condenser is charged through the coil and current flow through the latter is halted. This obviously de-energizes the relay. When the load switch is closed, said condenser discharges into the load and the relay is energized by the resultant current flow through its coil to the load. Energization of the relay moves the transfer contact thereof and the condenser is recharged through the coil and also through the variable resistor, the latter determining the rate of charge. When the condenser is sufficiently charged, the cycle is repeated. In this arrangement the condenser must be of such size that it is capable of operating the load.

In another form of the invention the circuit is arranged in such manner that the condenser need not be of a size sufficient to operate the load. In this arrangement the variable resistor is eliminated and the transfer contact is connected to the load switch for alternative contact with the relay coil and the condenser and with the positive terminal of the relay coil. Here, assuming that the condenser is fully charged and the relay de-energized, closure of the load switch allows the condenser to discharge ineffectually into the load and allows current to flow through the coil in order to permit energization of the relay. Such energization closes the circuit between the load switch and the positive supply and the latter effectively operates the load. At the same time the normally closed circuit between said switch and the condenser is opened and current flows through the relay coil into the condenser. This, of course, charges the condenser and the relay is deenergized to begin a new cycle of operation. Obviously, the resistance of the relay coil must be high as compared to that of the load.

In known systems wherein a step relay switch is utilized interrupter contacts are provided to effect the necessary "homing" of the switch. These interrupter contacts are objectionable due to the fact that they occasion severe arcing which shortens their lives and causes radiated interference.

Another object of the invention, therefore, is to apply the pulse generator of the invention to a step relay in such manner as to eliminate the troublesome interrupter contacts.

Preferably, the first mentioned form of the generator of the invention has its load switch arranged normally to complete a circuit from the generator to a normally open contact in the step relay switch. The alternative or opposite position of said load switch completes a circuit from the generator to a normally closed contact in the step relay switch. These step relay switch contacts cooperate with a cam operated transfer contact which is connected to the relay coil to effect energization of the latter. The contacts are usually referred to as the "homing" contacts.

The operation of the load switch allows the generator to pulse the step relay switch which in known manner steps the latter from one setting to the next. At a definite point in the operation of the step relay switch, say the last step, the homing transfer contact thereof switches over, disconnecting the coil of the relay from the pulse generator. When the load switch is released or set to its original position, the step relay coil is energized once through the alternative path of the said transfer contact. This one energization of the relay switches the latter's transfer contact back to its normal or home position and the device is prepared for another operation.

Other objects and features of the invention will become apparent from the following description when read in the light of the attached drawings of which:

Fig. 1 is a schematic wiring diagram of the first form of the invention.

Fig. 2 is a schematic wiring diagram of the second form of the invention and

Fig. 3 is a schematic wiring diagram illustrating the application of the first form of the invention to a step relay switch.

Referring to Fig. 1, a relay coil 10 has one terminal connected to positive supply and the other terminal connected to a transfer contact 11 of the relay and a condenser 12 tied to ground. A variable resistor 13 is connected between the positive terminal of relay 10 and a contact 14 associated with the transfer contact 11 but normally separated therefrom. Transfer contact 11 normally engages a contact 15 which is connected with one terminal of a manually, or automatically, operable switch $S_1$ whose other terminal is connected to a suitable load 16 tied to ground. The operation of the device is as follows.

Load switch $S_1$ is normally open and condenser 12 is normally fully charged, resulting in that no current flows through relay coil 10 to energize the latter. However, on closure of switch $S_1$, condenser 12 discharges into load 16 and operates the latter, and current flows through coil 10 to the load. This current flow through the coil energizes the relay, and transfer contact 11 moves over to engage contact 14. Thus, parallel paths through coil 10 and variable resistor 13 are provided for current flow from positive supply to condenser 12, and the latter becomes fully charged once again. When the charge on condenser 12 reaches the critical point and insufficient current flows through coil 10 to energize the relay, the latter becomes de-energized and transer contact 11 moves back into engagement with contact 15. At this point a new cycle of operation begins.

Variable resistor 13 determines the rate of charge of condenser 12 and may be adjusted to meet the individual user's requirements. Condenser 12 must be of sufficient size to operate load 16 and the choice of its value, therefore, is dependent upon the load which the individual user wishes to pulse.

Referring now to Fig. 2, a relay coil 18 has one terminal connected to positive supply and the other to a contact 20 of the relay and a condenser 21 which is tied to ground. A second contact 22 of the relay is connected to the positive terminal of coil 18 and is positioned for cooperation with a transfer contact 19 wired to a load switch S₁ which alternately connects it and contact 20 with a suitable load 23. Normally, transfer contact 19 engages contact 20. The operation of the device is as follows.

When switch S₁ is open, and condenser 21 is fully charged, no current flows in coil 18 and the relay is de-energized. However, when switch S₁ is closed, condenser 21 discharges ineffectually into load 23 and current flows through coil 18 to energize the relay. This transfers contact 19 to provide a direct path from positive supply to the load and opens the connection between said transfer contact and contact 20 to force the current flowing through coil 18 to charge condenser 21. When said condenser is charged sufficiently, the relay is de-energized and the operation of the device is re-cycled.

In the second form of the invention the size of condenser 21 is relatively unimportant as it is not required to operate load 23, the latter being operated directly from the positive supply when the relay is energized. It is important, however, that the resistance of coil 18 be high as compared to load 23 so that when switch S₁ is closed, sufficient current flows through the coil to energize the relay. Adjustment of the frequency of the second form of the invention can be obtained by utilizing condensers of various values, by adjusting the relay spring, or in any other known manner.

It will be noted that in both forms of the invention the pulse generator is held inoperative, except when the load switch is closed, by the series condenser which prevents current flow in the relay coil.

Referring now to Fig. 3, the invention is shown as applied to a step relay switch. Preferably the first described form of the invention is used in this connection. The step relay switch may be of the usual sort which includes a coil 25 adapted to be energized momentarily by closure of a switch 24 and adapted when so energized to condition a contactor to be stepped from one position to another by a spring or the like. In known manner step relay switches are advanced one step at each operation thereof for a definite number of steps, after the last of which, a "homing" operation takes place. This "homing" consists of returning the stepping contactor to its first or original position. As usual, the step relay switch is provided with a cam operated transfer homing contact 26 which for each of the steps of said contactor, save the last, is in the position shown on the drawing but which, when said contactor steps to its last position, transfers. In the first mentioned or home position of the transfer contact it engages, in the present instance, a connector loop 27 and in the second position thereof it contacts a second loop 28. The load switch S₁ for connecting the pulse generator with the step relay switch is, in the present instance, a single pole, double throw switch which is normally in contact with the connector loop 28. The operation of the device is as follows.

When transfer contact 26 is in its normal or "home" position as shown on the drawings and switch S₁ is in its normal position, the pulse generator is inoperative due to the fact that loop 28 is not connected to the load. At this time the step relay is under control of its operating switch 24. However, when the step relay switch is advanced to its last step and transfer contact 26 switches into engagement with loop 28, the pulse generator is connected with the load and operates coil 25 to reset or "home" said step relay switch. This re-transfers contact 26 and the pulse generator again becomes inoperative.

If at any time it is desired to "home" the step relay switch regardless of the latter's position, all that is required is to move switch S₁ into contact with loop 27. This connects the pulse generator with the load through the transfer contact 26 which is also engaged with loop 27, and the generator pulses coil 25 to bring the step relay switch to its last position. At this time, transfer contact 26 transfers, opening the load circuit of the pulse generator and inactivating the latter. Restoration of switch S₁ to its normal position, wherein it engages loop 28, homes the step relay in the manner described above.

It is to be noted that the application of the pulse generator of the invention to the step relay obviates the need for interrupter contacts in the latter.

While there have been above described but a limited number of modifications of the invention, it is obvious that many changes in and additions thereto may be made without departing from the spirit of the invention and it is not desired, therefore, to limit the invention except as set forth in the following claims or as dictated by the prior art.

I claim:

1. A pulse generator operative only when a load is connected thereto, which includes a source of supply, a relay having its coil connected to the positive side of said source, a condenser connected between the other side of the relay coil and the other side of said source, a transfer contact of the relay connected to said other side of the relay coil, a load switch connected between said transfer contact and the load when the relay is de-energized, and a variable resistor connected from the positive side of the relay coil to said transfer contact when the relay is energized, said condenser being sufficiently large to operate the load and said resistor determining the rate of charge of the condenser.

2. A pulse generator operable only when a load is applied thereto, which comprises a source of supply, a relay having one terminal of its coil connected to the positive side of said source, a condenser connected to the other side of said source and charged by current flow through the coil, contacts normally closed to provide a discharge path into the load for said condenser, said contacts opening on energization of said relay and a switch in said path operable to disconnect the load from the generator.

3. A pulse generator operable only when a load is applied thereto, which comprises a relay, a condenser in series with the relay coil to cut off current flow in the latter when charged, a normally open shunt path across said relay coil, a transfer contact having associated therewith a front and a back contact, said transfer contact normally cooperating with the back contact to provide a path which when connected to the load permits the condenser to discharge, but when transferred, cooperating with the front contact to close said relay coil shunt path.

4. The combination with a load, of a pulse generator operable only when a load is applied thereto which comprises a relay, a condenser in series with the relay coil to cut off current flow in the latter when charged, normally closed contacts of the relay providing a path which, when it is connected to the load permits the condenser to discharge, and a variable resistor connected across said coil when said closed contacts are opened.

5. In a pulse generator for pulsating a load which is disconnectable therefrom, the combination of a source of supply, a relay having its coil connected to said source of supply, a condenser connected in series between the coil and supply return to cut off current flow in the coil when charged, a normally open shunt path across said relay coil, a transfer contact having associated therewith a front and a back contact, said transfer contact normally cooperating with the back contact to provide a path which when connected to the load permits the condenser to discharge, but when transferred, cooperating with the front contact to close said relay coil shunt path.

6. In a pulse generator for pulsating a load which is disconnectable therefrom, the combination of a source of supply, a relay having its coil connected to said source of supply, a condenser connected in series between the coil and supply return to cut off current flow in the coil when charged, and a transfer contact of the relay normally providing a condenser discharge path to the load when the latter is connected thereto, but directly connecting said supply source and said path when transferred.

7. In a pulse generator for pulsating a load which is disconnectable therefrom, the combination of a source of supply, a relay having its coil connected to said source of supply, a condenser connected in series between the coil and supply return to cut off current flow in the coil when charged, normally closed contacts of the relay providing a condenser discharge path to the load when the latter is connected thereto, and a variable resistor connected across said coil when said closed contacts are opened to determine the rate of charge of said condenser.

8. The combination with a step relay switch including a coil, means for exciting the coil to step the relay switch to a plurality of positions, and a homing transfer contact mechanically controlled by said relay switch and electrically connected to the coil, of a pair of connector loops, a first contacted by said transfer contact when the step relay switch is in its last position and a second when the switch is in its other positions, a settable swich for contacting said loops alternatively but normally contacting said first loop; and a pulse generator operable only when said coil is connected thereto, comprising a relay, a condenser in series with the relay coil to cut off current flow in the latter when charged, and normally closed contacts of the relay, one of said contacts being connected to said settable switch and the other being connected to a point between said relay coil and condenser, providing a condenser discharge path through said settable switch when said step relay coil is connected to the latter.

9. The combination with a step relay switch including a coil, means for exciting the coil to step the relay switch to a plurality of positions, a homing transfer contact mechanically controlled by said relay switch and electrically connected to the coil, of a pair of connector loops, a first contacted by said homing transfer contact when the step relay switch is in its last position and a second when the switch is in its other positions, a settable switch for contacting said loops alternatively but normally contacting said first loop; and a pulse generator operable only when said coil is connected thereto, comprising a relay, a condenser in series with the relay coil to cut off current flow in the latter when charged, a transfer contact having a front and a back contact associated therewith, said transfer contact normally cooperating with the back contact to provide a condenser discharge path through said settable switch when said step relay coil is connected to the latter, and a variable resistor connected across said coil when said transfer contact cooperates with the front contact to determine the rate of charge of the condenser.

References Cited in the file of this patent

UNITED STATES PATENTS

| Number | Name | Date |
|---|---|---|
| 1,475,933 | Carroll | Dec. 4, 1923 |
| 1,914,215 | Price | June 13, 1933 |
| 2,221,867 | Feingold | Nov. 19, 1940 |
| 2,237,003 | Kiltie | Apr. 1, 1941 |
| 2,265,224 | Burton | Dec. 9, 1941 |
| 2,298,003 | Feingold | Oct. 6, 1942 |
| 2,336,897 | Shipton | Dec. 14, 1943 |
| 2,376,225 | Beyland | May 15, 1945 |
| 2,510,337 | Franklin | June 6, 1950 |